US012667104B2

(12) United States Patent
Sasson et al.

(10) Patent No.: US 12,667,104 B2
(45) Date of Patent: Jun. 30, 2026

(54) HERBICIDAL COMPOSITIONS

(71) Applicant: Yissum Research Development Company of the Hebrew University of Jerusalem LTD., Jerusalem (IL)

(72) Inventors: Yoel Sasson, Tel Aviv (IL); Uri Stoin, Jerusalem (IL)

(73) Assignee: Yissum Research Development Company of the Hebrew University of Jerusalem LTD., Jerusalem (IL)

( * ) Notice: Subject to any disclaimer, the term of this patent is extended or adjusted under 35 U.S.C. 154(b) by 1173 days.

(21) Appl. No.: 17/609,729

(22) PCT Filed: Mar. 11, 2020

(86) PCT No.: PCT/IL2020/050285

§ 371 (c)(1),
(2) Date: Nov. 8, 2021

(87) PCT Pub. No.: WO2020/225804

PCT Pub. Date: Nov. 12, 2020

(65) Prior Publication Data

US 2022/0225620 A1     Jul. 21, 2022

Related U.S. Application Data

(60) Provisional application No. 62/845,787, filed on May 9, 2019.

(51) Int. Cl.
| | |
|---|---|
| *A01N 59/00* | (2006.01) |
| *A01N 59/06* | (2006.01) |
| *A01P 13/00* | (2006.01) |

(52) U.S. Cl.
CPC ............. *A01N 59/00* (2013.01); *A01N 59/06* (2013.01); *A01P 13/00* (2021.08)

(58) Field of Classification Search
CPC ........ A01N 59/00; A01N 59/06; A01N 57/20; A01N 59/04; A01P 13/00
See application file for complete search history.

(56) References Cited

U.S. PATENT DOCUMENTS

| | | | |
|---|---|---|---|
| 3,591,360 A | 7/1971 | Vahlsing, Jr. | |
| 5,376,293 A * | 12/1994 | Johnston ................ | C09K 3/185 |
| | | | 252/79 |
| 6,065,686 A | 5/2000 | Betts-Williams et al. | |
| 2010/0016160 A1 * | 1/2010 | Bettarini ................ | A01N 47/36 |
| | | | 504/136 |
| 2015/0075239 A1 * | 3/2015 | Yamashita ............... | C05G 5/23 |
| | | | 71/23 |

FOREIGN PATENT DOCUMENTS

| | | | |
|---|---|---|---|
| CN | 103819113 A | 5/2014 | |
| CN | 103881043 A | 6/2014 | |
| CN | 106508975 A | 3/2017 | |
| CN | 107469536 A | 12/2017 | |
| JP | 2003-221813 A | 8/2003 | |
| JP | 2018-050528 A | 4/2018 | |
| JP | 2019-156765 A | 9/2019 | |
| KR | 10-1790488 B1 | 10/2017 | |
| WO | WO-2018083611 A1 * | 5/2018 | ............. A01N 59/00 |

OTHER PUBLICATIONS

"General Information for calcium hydroxide," PPDB, <https://sitem.herts.ac.uk/aeru/ppdb/en/Reports/110.htm>, Dec. 17, 2015, p. 1-7.*
PCT, International Search Report and Written Opinion for PCT/IL2020/050285, May 29, 2020.
Koperek, E., "Potassium Lye-world agriculture solutions"; Aug. 15, 2015, pp. 1-10.
Pesticide Properties Database, https://sitem.herts.ac.uk/aeru/ppdb/en/index.htm, Feb. 3, 2007.
Chowdhury et al., "The incorporation of wood waste ash as a partial cement replacement material for making structural grade concrete: An overview," Ain Shams Engineering Journal, 2014, vol. 6, No. 2, pp. 429-437.
Communication in European Patent Application No. EP20714704.2, mailed Apr. 25, 2024, 7 pages.

* cited by examiner

*Primary Examiner* — Monica A Shin

(74) *Attorney, Agent, or Firm* — Orrick, Herrington & Sutcliffe LLP

(57) ABSTRACT

The invention is method of combatting weeds, which comprises applying to a soil region an herbicidal combination comprising: at least one alkali metal compound selected from alkali hydroxide, alkali carbonate and alkali bicarbonate; and at least one calcium compound selected from calcium hydroxide and calcium bicarbonate; such that the predominant component of the combination is(are) the alkali metal compound(s). Herbicidal formulations are also provided by the invention.

13 Claims, 3 Drawing Sheets

Figure 1: 1 - The planters with irrigation system, day 0.

2- The planters with irrigation system, day 30.

FIGURE 2A
FIGURE 2B
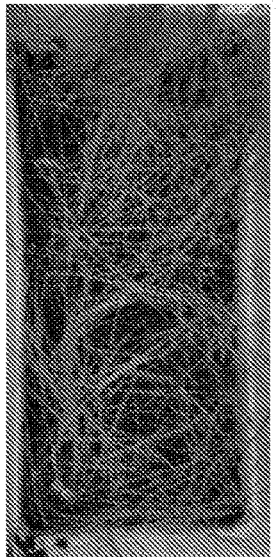
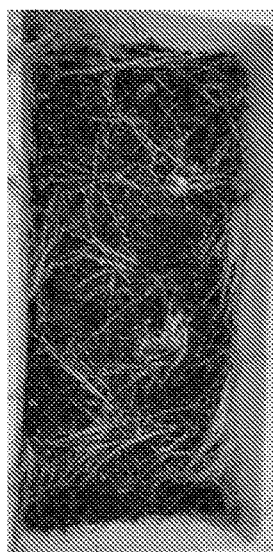
Reference after 30 days of treatment (60 days from planting)
Treated sample, after 30 days of treatment (60 days from planting)
Figure 2: Grass treated with liquid mixture (dissolved salts)
FIGURE 3A
FIGURE 3B
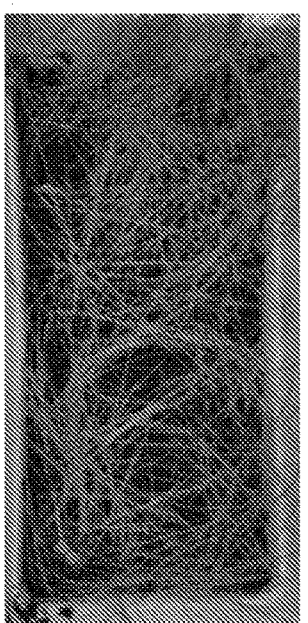
Reference after 30 days of treatment (60 days from planting)
Treated sample, after 30 days of treatment (60 days from planting)
Figure 3: Grass treated with solid mix (tablet)

Figure 4: Sleepers after two months of dipping in the reaction mixture.

HERBICIDAL COMPOSITIONS

BACKGROUND OF THE INVENTION

There exists a need to destroy weeds in agricultural fields prior to seeding or planting. There are also situations where it is desired to destroy/remove existing vegetation and prevent growth of future vegetation in a permanent manner in certain areas, for example, where communication, electricity or water lines, crude oil or gas pipes, sewage constructions etc., are placed.

Another example where permanent removal of weeds is required is in the vicinity of railway tracks. The relevant non-vegetation protocols can be divided into two main groups: methods for preventing the growth of unwanted plants in the track and procedures for removal of weeds and plants. There are several methods to prevent and remove of vegetation such as biological, chemical, mechanical, and electro-thermal. The constructional measures are most effective overall for preventing in-growth of vegetation because they decrease the water available in the track area. However, due to high cost, they are used chiefly for new constructions or completely rebuilt sections, or in areas with total bans on herbicides. Hence, the leading market solution is the use of soil herbicides. The main advantages of this approach are that it is rapid, efficient, safe and economical. However, it may still lead to contamination of ground and drinking water. In earlier years, soil herbicides such as Atrazine and Diuron were used. But their low biodegradability and effective water permeability of the track foundation resulted in pollution of soil and drinking water. Therefore, for example, since 1990's, the SBB railway authority uses only leaf herbicides (absorbed via the green parts of the plant). Despite that, underground and drinking water pollution is steadily increasing. Hence, there exists a need for environmentally friendly, economically feasible methods of controlling of vegetation on tracks.

We propose a method to prevent vegetation sprouting and growing, using inorganic alkaline compounds. Some inorganic alkaline compounds are known to possess pesticidal activity. According to the PPDB (Pesticide Properties Database created by the university of Hertfordshire https://sitem.herts.ac.uk/aeru/ppdb/en/index.htm) calcium hydroxide [Ca(OH)$_2$], is an inorganic herbicide and fungicide, whose range of pesticidal functions tend not to be agriculturally focused. Other examples of alkali compounds registered in PPDB are sodium carbonate, Na$_2$CO$_3$, indicated as inorganic multi-purpose herbicide and fungicide for non-crop applications and sodium bicarbonate, NaHCO$_3$, which is reported as a fungicide. Alkali hydroxides are not registered in PPDB, but farmers seem to be aware of the herbicidal activity of NaOH and KOH (https:worldagriculturesolutions.com/2015/05/08/organic-herbicides/).

Relatively little has been reported on herbicidal activity of combinations of inorganic alkaline compounds. See, for example, JP 2003-221813, JP 2018-050528 and JP 2019-156765. The latter describes a solid herbicidal composition whose active component is an alkaline sodium salt, an alkaline calcium salt and alkaline potassium salt, which can be used alone or in combination. The alkaline compound illustrated in the experimental work reported in JP 2019-156765 is sodium bicarbonate.

SUMMARY OF THE INVENTION

We have now found that some combinations of alkaline compounds display potent herbicidal activity. The experimental results reported below indicate that it is possible to reduce the applied amounts of alkaline compounds by forming suitably proportioned mixtures, yet generate improved or accelerated herbicidal effects, achieving efficient weed control unattainable by glyphosate (glyphosate, better known by its brand name Roundup®, is probably the most famous herbicide used for broad-spectrum control of weeds and grasses).

Accordingly, the present invention is primarily directed to a method of combatting weeds in a soil region, which comprises applying an herbicidal combination comprising:

at least one alkali metal compound selected from alkali hydroxide (NaOH, KOH), alkali carbonate (Na$_2$CO$_3$, K$_2$CO$_3$) and alkali bicarbonate (NaHCO$_3$, KHCO$_3$); and at least one calcium compound selected from calcium hydroxide (Ca(OH)$_2$) and calcium bicarbonate (Ca(HCO$_3$)$_2$).

The predominant component of the combination is(are) the alkali metal compound(s). The weight ratio of alkali compound(s) to calcium compound may be in the range from 100:1 to 1.5:1, e.g., from 30:1 to 1.5:1 (for example, from 10:1 to 1.5:1, e.g., from 5:1 to 1.5:1, inclusive). When two or more alkali compounds are present, their total amount is considered for calculating the weight ratio relative to the calcium compound.

The herbicidal combinations of the invention are generally binary or ternary combinations of alkaline agents. Experimental work conducted in support of this invention shows that despite the fact that the individual alkaline compounds are no match for glyphosate, their ternary combinations, consisting of sodium hydroxide, potassium hydroxide and calcium hydroxide (or calcium bicarbonate) generate comparable and even stronger herbicidal effect compared to glyphosate. For example, eradication of the weeds can be achieved with the aid of such combinations, including killing of glyphosate-resistant species at shorter times, applying moderate amounts of the three alkaline compounds. Hence, a method for combatting weeds and targeting glyphosate-resistant species, such as *Vitex cymosa, Conyza sumatrensis, Digitaria insularis, Euphorba heterophylla, Bidens subaltern, Abutilon grandifolium,* tree tobacco, *Vachellia aroma* and *Vachellia aroma,* forms another aspect of the invention. See, for example, Heap et al. [Pest Manag Sci. 2018 May; 74(5):1040-1049], for further data on glyphosate-resistant weeds worldwide.

Preferred herbicidal combinations applied by the method of the invention to combat weeds contain the following combinations:

Sodium hydroxide/calcium hydroxide (proportion by weight from 2.5:1 to 1.5:1, e.g., 2.25:1 to 1.75:1, e.g., ~2:1).

Potassium hydroxide/calcium hydroxide (proportion by weight from 5:1 to 3:1, e.g., 4.5:1 to 3.5:1, e.g., ~4:1).

Sodium hydroxide/potassium hydroxide/calcium hydroxide (proportion by weight [NaOH+KOH]:Ca(OH)$_2$ is from 30:1 to 1.5:1, e.g., 10:1 to 1.5:1, e.g., from 5:1 to 1.5:1, for example, from 5:1 to 3:1 and from 3:1 to 1.5:1, while the mixing ratio of the alkali hydroxides NaOH:KOH is in the range from 10:1 to 1:10, e.g., from 5:1 to 1:5 (3:1 to 1:1, e.g., 2:1 to 1:1).

Sodium hydroxide/potassium hydroxide/calcium bicarbonate (proportion by weight [NaOH+KOH]:Ca(HCO$_3$)$_2$ is from 30:1 to 1.5:1, e.g., 10:1 to 1.5:1, e.g., from 5:1 to 1.5:1, for example, from 5:1 to 3:1 and from 3:1 to 1.5:1, while the mixing ratio of alkali hydroxides NaOH:KOH is in the range from 10:1 to 1:10, e.g., from 5:1 to 1:5 (3:1 to 1:1, e.g., 2:1 to 1:1).

Ternary combinations consisting of NaOH/KOH/Ca (OH)$_2$ or NaOH/KOH/Ca(HCO$_3$)$_2$ with weight mixing ratios of [NaOH+KOH]:calcium compound in the range from 4.25:1 to 3.75:1, e.g., ~4:1, wherein the alkali hydroxide compounds (NaOH:KOH) are proportioned in the range from 2:1 to 1:1, e.g., around 1:1, were tested in the experimental work reported below and were shown to possess a strong herbicidal effect. For convenience, these preferred combinations are designated by mixing ratios expressed by the integer numbers 5:3:2 (NaOH:KOH:Ca(OH)$_2$ or NaOH: KOH:Ca(HCO$_3$)$_2$). Shifting the mixing ratios in favor of calcium hydroxide, e.g., increasing the content of the calcium compound from 20%, 30%, 40%, namely, using combinations of NaOH:KOH:Ca(OH)$_2$ proportioned 4:3:3 or 3:3:4 by weight, respectively, will slow down the herbicidal effect, but on the other hand, such combinations are of potential of long-term benefit, able to suppress new grass growth for long time periods extending over several months. Work conducted in support of this invention based on field trials indicates that getting new grass growing on plots treated with [NaOH+KOH]:Ca(OH)$_2$ (or Ca(HCO$_3$)$_2$) with mixing ratios from 3:1 to 1.5:1 (namely, where calcium hydroxide constitutes from 25 to 40% by weight of the herbicidal mixture) demonstrate potential of long-term benefit.

Another aspect of the invention is herbicidal composition comprising the ternary combinations proportioned as set forth above, formulated as sprayable aqueous solution/ suspension to be applied to the weeds, where the total amount of sodium hydroxide, potassium hydroxide and calcium hydroxide (or calcium bicarbonate) in the sprayable formulation is from 10 g to 250 g per liter water, for example, from 15 g to 220 g per liter water (e.g., from 15 to 50 g per liter water). The concentration of the alkali hydroxide(s) in the sprayable solution applied to the weeds is from 0.1% to 48%, preferably in a range of 1% to 20%, for example in a range of 10% to 15%, e.g., 7 to 15%. The concentration of the calcium compound is from 0.01% to 10%, preferably in a range of 0.01% to 5% most preferably in a range of 1% to 5% by weight.

The invention also provides herbicidal formulation comprising sodium hydroxide, potassium hydroxide and an alkaline calcium compound (e.g., calcium hydroxide or calcium bicarbonate) at mixing ratios [NaOH+KOH]/alkaline calcium compound in the range from 30:1 to 1.5:1, e.g., from 10:1 to 1.5:1, e.g., from 5:1 to 1.5:1, e.g., from 5:1 to 3:1, while the mixing ratio of the alkali hydroxides NaOH: KOH is in the range from 5:1 to 1:5, specifically 3:1 to 1:1, such as 2:1 to 1:1.

For example, the herbicidal formulation is an aqueous herbicidal concentrate, in which the total amount of sodium hydroxide/potassium hydroxide is formulated up to saturation and the calcium compound is dissolved/suspended in an amount complying with the proportions set forth above. The invention provides an aqueous herbicidal concentrate comprising sodium hydroxide and potassium hydroxide in a total amount of not less than 250 g, e.g., from 300 to 480 g, and in addition, not less than 10 g, e.g., more than 50 g, e.g., from 70 to 120 g, of the calcium compound (per 1 liter water). The aqueous concentrate is diluted prior to use by water addition to provide the sprayable compositions described above.

The herbicidal formulation may be in a solid form, e.g., granules and tablets, comprising a suitably proportioned ternary combination, namely, [NaOH+KOH]/Ca(OH)$_2$, or [NaOH+KOH]/Ca(HCO$_3$)$_2$, as described above. The solid herbicidal composition can be dispersed in appropriate amount of water in the spray tank under agitation, to release the active ingredients and produce the sprayable composition described above, which can then be applied to the weeds. However, there are some benefits to the direct application of solid formulations, e.g., in a tablet or granular form, as described below.

DETAILED DESCRIPTION OF THE INVENTION

The combination of alkaline compounds of the present invention works as a non-selective herbicide or "total weed-killer" that destroys in a non-selective manner all types of plant material with which they come in contact. One of the major uses of the herbicidally active combination disclosed herein is to keep the area around railways free from vegetation, and it is noteworthy that the combinations were tested to assess their potential effect on railway sleepers, by immersing a railway sleeper in an aqueous solution of mixed hydroxides for a period of two months. The sleeper was visually examined after the two-month period, and no damage was noted, as shown by the photos appended in FIG. 4.

Another important use of the herbicidal combination disclosed herein is to control weed leftovers in the seasonal vegetation areas after harvest.

To determine the effect of the combined alkaline treatment on the soil, soil parameters such as soil pH, soil salinity and soil moisture were measured before and during the treatment as part a large plot (100 m$^2$) experiment. The tested parameters did not vary significantly during to the treatment.

Thus, the method allows efficient prevention of growth of vegetation and removal of existing vegetation. The proposed method is environmentally friendly and harmless for the groundwater and soil, including infrastructure and especially railway infrastructure, and can be an alternative for use of organic herbicides.

The term "combatting" or "inhibiting" refers to prevention of future growth of weeds and/or to destruction of existing weeds present in a soil region.

The term "soil region" refers to an area having at least in part an exposed soil section where it is desired to destroy/ remove existing vegetation, and/or prevent future growth of vegetation in a non-selective manner (i.e. not where it is desired to destroy a weed and spare a commercial crop), for example, for prolonged periods of time up to several months. Examples of soil regions are waste grounds, industrial and construction sites, regions near electric, communication water and sewage lines, railways and railway embankments. Another example of soil region to which the herbicidal combination can be applied to control weeds is an agricultural field, after harvesting and before seeding or planting.

The term "applying" refers to manner of application such as by spraying or irrigation of the desired region by any system known in the art. The application can also be carried out using a control system that automatically applies the herbicidal composition of the invention, at pre-defined intervals to the desired soil region. The method of the invention includes pre and postemergence application of the herbicidal compositions.

The alkaline compounds can be mixed in a single volume of water to form a mixture solution/suspension before application or can be present in two separate solutions/suspensions to be applied simultaneously or sequentially to the desired soil region.

Experimental results reported below indicate that simultaneous application of equal amounts of glyphosate and the sodium hydroxide/potassium hydroxide/calcium hydroxide combination (the combination is proportioned 5:3:2) does not lead to superior results compared to the application of the sodium hydroxide/potassium hydroxide/calcium hydroxide combination alone. In the method of the present invention, it is preferred to apply the combination of alkaline compounds as the sole herbicidally active ingredient, without the use of another herbicide (although the applied composition may contain other agents not related to their herbicidal activities, namely, adjuvants including adherents and surfactants).

As pointed out above, the combinations can be used in the form of mixed formulations of the individual components. Alkali hydroxides are very water-soluble and can be easily formulated in water to form a sprayable aqueous solution by dissolving NaOH and KOH powders, pellets or granules in water directly in the spray tank. Addition of calcium hydroxide to alkali hydroxide solutions beyond its solubility limit (~1.7 g/L at 20° C.) may lead to the formation of a suspension. With vigorous agitation and/or use of appropriate adjuvants in the spray tank, the sodium hydroxide/potassium hydroxide/calcium hydroxide suspension is applicable to spraying. During field experiments conducted in support of this invention, no problems were encountered due to clogging of the nozzles of the sprayer. Hence such combinations can be prepared by the farmer in a spray tank by combining the individual components for application together. It should be noted that calcium oxide can be added to the spray tank in place of calcium hydroxide, because it reacts in water to form calcium hydroxide.

Calcium bicarbonate demonstrates good water solubility (~166 g/L at 20° C.), but its incorporation into alkali hydroxide aqueous solution to afford sodium hydroxide/ potassium hydroxide/calcium bicarbonate would also result in formation of suspension owing to precipitation of calcium hydroxide in the highly alkaline environment. However, the so-formed suspension is sprayable, as explained above.

Alternatively, in view of their different water solubility, the alkali hydroxide(s) and calcium hydroxide (or calcium bicarbonate) can be distributed over the ground separately, the former as sprayable solution and the latter in a solid (e.g., tablet, granular) form which is dissolved by the action of the applied alkali hydroxide solution and added water.

Agrochemical premixes are often easier to apply because the individual components are mixed in advance at the desired proportion by the manufacturer. The herbicidal combinations of the invention can be commercialized in the form of liquid and solid formulations.

One example of liquid herbicidal formulation is an aqueous solution/suspension concentrate, e.g., containing sodium hydroxide and potassium hydroxide in a total amount of not less than 250 g, e.g., from 300 to 480 g, and in addition, not less than 10 g, e.g., >30 g, for example, >50 g, e.g., from 70-120 g, of the calcium compound (per 1 liter water). Such aqueous concentrates may be packed in varying pack sizes from 1 liter to 1000 liter or more, such that 100-500 ml of the concentrate is added to 1 liter of water for dilution to provide the sprayable solution/suspension, to be applied, e.g., in agricultural fields.

The aqueous concentrates can be used for distribution of the herbicidal combination around railroads. As pointed out above, weeds in the vicinity of railroads are controlled chiefly because of safety concerns (track visibility, signs visibility, accessibility to enable easy and safe maintenance by workers). Vehicles adapted to travel along the railway track are provided with an array of ground-directed nozzles to deliver sprayable solution made by dilution of the concentrate with water. See, for example, U.S. Pat. No. 6,065, 686. Such vehicles include mixing tanks designed to combine separate streams of the herbicidally active components and water to form the desired formulation, to attack the targeted weeds. Rail-equipped vehicles are currently on commercial use (FerroSafe's vehicles).

Examples of solid herbicidal formulations include suitably proportioned mixtures in the form of wettable powders, water dispersible granules or tablets, which dissolve/disperses rapidly in the tank mix to achieve the desired solution/suspension strength for application. However, in addition to offering a convenient way of handling and supplying the herbicidally active binary/ternary combinations to the spray tank, the solid formulations of the invention, e.g. tablets made of $NaOH/KOH/Ca(OH)_2$, $NaOH/KOH/CaO$ or $NaOH/KOH/Ca(HCO_3)_2$ have their own advantages. Experimental work conducted in support of this invention indicates that powder mixtures of alkali hydroxide/calcium hydroxide are amenable to direct compression into tablets, and that the so-formed tablets possess satisfactory mechanical strength and can exert their herbicidal action following irrigation. For example, their distribution on the ground can be scheduled according to expected rain days, to achieve an efficient weed control with prolonged effect.

The rate of application of the herbicidal combination may vary from 10 to 500 liters per hectare of aqueous solutions/ suspensions which contain from 10 g to 250 g of the alkaline compounds per liter water, e.g., 15 g to 100 g per liter water. The total amount of the herbicidal combination applied is therefore from 0.1 kg to 50 kg per hectare, for example from 0.1 to 25 kg per hectare.

BRIEF DESCRIPTION OF THE DRAWINGS

FIG. 2A and FIG. 2B are photos taken at t=60 days, of a control (nontreated) planter (2A) and a planter treated with an aqueous composition of the herbicidal combination (2B).

FIG. 3A and FIG. 3B are photos taken at t=60 days, of a control (nontreated) planter (3A) and a planter treated with solid composition (tablet formulation) of the herbicidal combination.

EXAMPLES

Example 1

Preparation of Aqueous Concentrate Formulation of $NaOH/KOH/Ca(OH)_2$

The solid materials ($NaOH/KOH/CaOH_2$) were added to 100 L barrel, followed by addition of water to reach the saturation limit, ~48%, of the alkali hydroxides. That is, a total of 480 g of NaOH/KOH (300 g NaOH+180 g KOH) and 120 g $Ca(OH)_2$ in 1 liter of water, such that the mixing ratios are 5:3:2 by weight. A suspension was formed (the amount of $Ca(OH)_2$ exceeded the saturation limit), which was stirred for 10-15 minutes with an industrial vertical agitator (100 rpm, Blossom LTD).

The aqueous concentrate was diluted prior to use by addition of water in a spray tank down to the working

7 | 8 concentrations set out in Examples 4 and 5 to afford a sprayable suspension employed in the field experiments reported hereinbelow.

Example 2

Preparation of Water Dispersible Tablet Formulation of NaOH/Ca(OH)$_2$

A mixture consisting of the NaOH/Ca(OH)$_2$ powders (2:1 weight ratio) was blended and homogenized in a solid homogenizer. The blend was compressed in a tablet press (JM16, under pressure of to 320 kg) to produce tablets (~13 mm diameter). The tablets were mechanically strong and well-dispersible in water. These NaOH/Ca(OH)$_2$ (2:1) tablets were used in the experiment reported in Example 3.

By a similar procedure, a blend consisting of a ternary combination, NaOH/KOH/CaOH$_2$ (5:3:2), is formed into tablets.

Example 3

Weed Control: Experiment in Planters

Figure 1A:
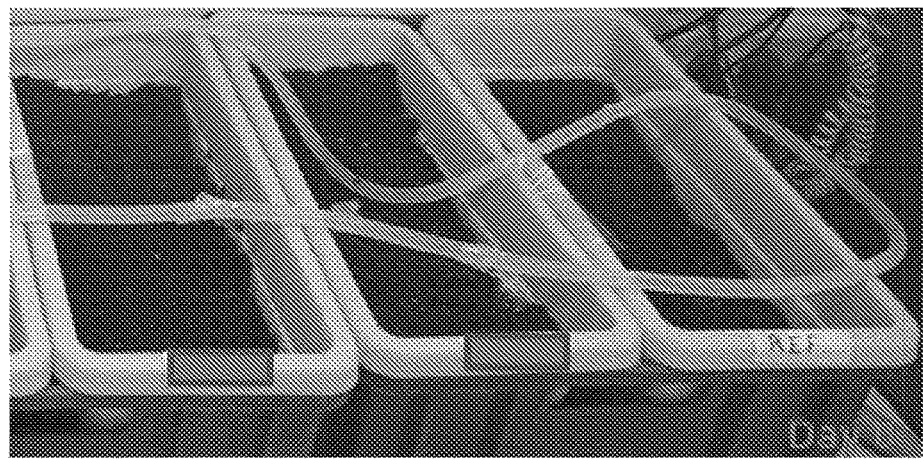
FIG. 1A and FIG. 1B are photos of planters in which grass was grown, taken at t=0 and t=30 days, respectively.
Figure 1B:
Figure 4:
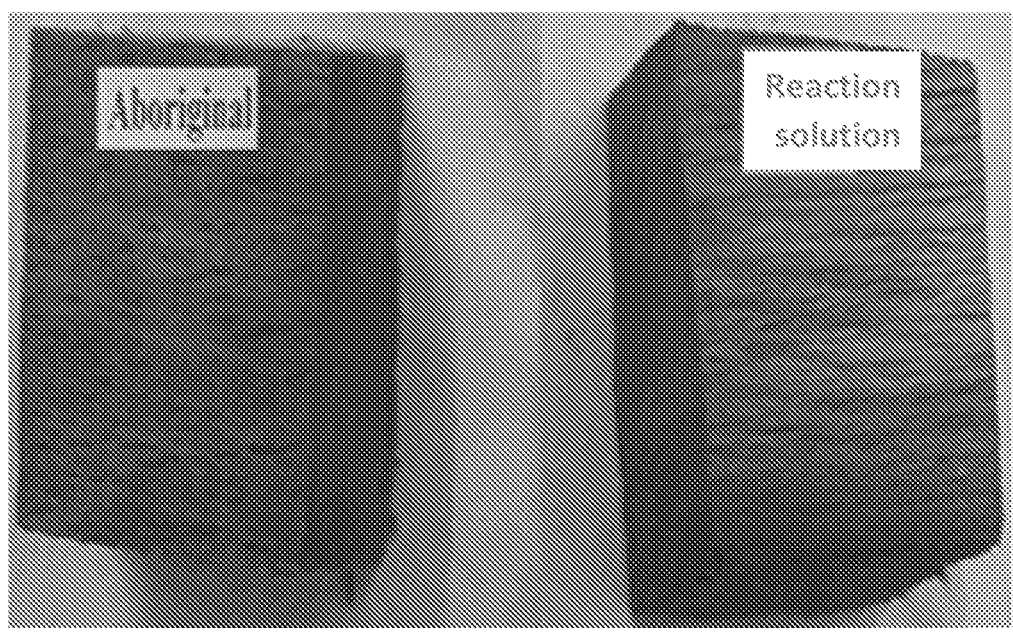
FIG. 4 is a photo showing rail sleepers. Left: reference rail sleeper. Right: a rail sleeper immersed in the aqueous alkaline composition of the herbicidal combination.

20 L planters were each filled with a mixture of approximately 15 L of soil and a fertilizer. Seeds of grass (paspalum grass) were planted in the planters. The grass was grown during one month with irrigation by an automatic system. Photos taken at the beginning of the experiment and at the end of the one-month growth period are shown in FIG. 1. The planters were then divided into three groups: reference (no treatment), A and B.

Group A: at the end of the month growth period, an aqueous composition comprising 10 g sodium hydroxide and 5 g calcium hydroxide in 1 L of water (in the form of a milky suspension, owing to insolubility of Ca(OH)$_2$) was applied onto each of the planters. The progress of the treatment was evaluated by visual inspection during an additional month. Photos taken at the end of two-month period (one-month treatment) are shown in FIG. 2B, compared to the reference (2A), indicating efficient weed control.

Group B: at the end of the month growth period, tablets consisting of mixed sodium hydroxide/calcium hydroxide (2:1) as prepared in Example 2 were added to the planters (the total amounts of the added hydroxides in each planter were 10 g and 5 g, respectively). The progress of the treatment was evaluated by visual inspection during an additional month. Photos taken at the end of two-month period (one-month treatment) are shown in FIG. 3B, compared to the reference (3A), indicating efficient weed control.

Additionally, wastewater of both treatments was collected. pH was measured, and GC-FID analysis was used for the detection of organic matter. It was found the wastewater pH was below 8. No organic leftovers were detected in the wastewater and water salinity was in the normal range.

Example 4

Weed Control: Small Scale Field Experiment

A weedy field was divided into 1 m×1 m plots, labeled 1-A to 1-N, 2-O to 2-P and 3-Q to 3-V. Aqueous compositions which contain either one, two or three components dissolved/suspended in water were applied to plots 1-A to 1-N, 2-O to 2-P and 3-Q to 3-V, respectively. The active components(s), the concentration of the dissolved/suspended active components in the aqueous composition (C, expressed as % by weight of the composition) and the mixing ratios in case of multiple components are tabulated in Table 1.

TABLE 1

| | Active component(s) | C (%) | Mixing ratio (% by weight) | 5 days | 12 days | 30 days | pH | Ca/K Value | Sal. |
|---|---|---|---|---|---|---|---|---|---|
| | Single-Component Aqueous Compositions (comparative) | | | | | | | | |
| 1-A | NaOH | 50 | 100 | C | B | B+ | 8> | ND | ND |
| 1-B | Na$_2$CO$_3$ | 16 | 100 | E | D | C | 8> | ND | ND |
| 1-C | NaHCO$_3$ | 9 | 100 | D | D+ | C | 8> | ND | ND |
| 1-D | KOH | 50 | 100 | C | B | B+ | 8> | ND | ND |
| 1-E | K$_2$CO$_3$ | 50 | 100 | D | C | B | 8> | ND | ND |
| 1-F | KHCO$_3$ | 32 | 100 | D | C | C+ | 8> | ND | ND |
| 1-G | Ca(OH)$_2$ | 1 | 100 | D | D | D+ | 7 | ND | ND |
| 1-H | CaCO$_3$ | 1 | 100 | E | E | E | 7 | ND | ND |
| 1-I | Ca(HCO$_3$)$_2$ | 16 | 100 | D | D+ | C | 8> | ND | ND |
| 1-J | Mg(OH)$_2$ | 1 | 100 | E | E | E | 7 | ND | ND |
| 1-K | MgCO$_3$ | 1 | 100 | E | E | E | 7 | ND | ND |
| 1-L | Mg(HCO$_3$)$_2$ | 1 | 100 | E | E | E | 7 | ND | ND |
| 1-M | Goal ® | 10 | 100 | D | C | B | 7 | NR | ND |
| 1-N | Roundup ® | 10 | 100 | D | C | A* | 7 | NR | ND |
| | Two-Component Aqueous Compositions (of the invention) | | | | | | | | |
| 2-O | KOH/Ca(OH)$_2$ | 10 | 80    20 | C | B | B+ | 8> | ND | ND |
| 2-P | NaOH/Ca(OH)$_2$ | 5 | 67    33 | C | C | B | 8> | ND | ND |
| | Three-Component Aqueous Compositions (of the Invention) | | | | | | | | |
| 3-Q | NaOH/KOH/ Ca(HCO$_3$)$_2$ | 1.5 | 50    30    20 | B | B+ | A | 8> | ↑ | ND |
| 3-R | NaOH/KOH/ Ca(OH)$_2$ | 1.5 | 50    30    20 | C | B+ | A | 8> | ↑ | NC |
| 3-S | NaOH/KOH/ Ca(OH)$_2$ | 1.5 | 30    30    40 | C | B+ | B+ | 8> | ↑ | NC |

TABLE 1-continued

| | Active component(s) | C (%) | Mixing ratio (% by weight) | | | 5 days | 12 days | 30 days | pH | Ca/K Value | Sal. |
|---|---|---|---|---|---|---|---|---|---|---|---|
| 3-T | NaOH/KOH/ Ca(OH)$_2$ | 1.5 | 40 | 30 | 30 | C | B+ | B+ | 8> ↑ | | NC |
| 3-U | NaOH/KOH/ Ca(OH)$_2$ | 5 | 50 | 30 | 20 | B | A | ND | 8> ↑ | | NC |
| 3-V | NaOH/KOH/ Ca(OH)$_2$ | 22 | 50 | 30 | 20 | A | ND | ND | 8> ↑ | | NC |

Compositions 1-A to 1-L, 2-O, 2-P and 3-Q to 3-V were prepared by dissolving water-soluble powders or pellets in water, or adding to water sparingly soluble powders, or combination of both, at the concentrations set out in Table 1, to form sprayable solutions/suspensions.

Compositions 1-M and 1-N are based on commercial herbicides available in the market (Roundup Ultra®max/ Roundup® full ii (Cuidado Ltd) and Goal® herbicide (Dow Ltd.) diluted to the concentrations set out in Table 1).

The herbicidal compositions were sprayed at rate of application of 100 liter per hectare.

The herbicidal effect was determined 5, 12 and 30 days after the treatment. To this end, five categories were defined:

A category: complete control of the weeds was achieved.
B category: severe damage was caused to the weeds.
C category: some damage was caused to the weeds.
D category: minor damage was caused to the weeds.
E category: no damage was caused to the weeds.

The results set out in Table 1 indicate that of the individually applied active compounds, only Glyphosate (the active material of Roundup®) achieved complete weed control, 30 days after the treatment (I-N), with the survival, of course, of glyphosate-resistant weeds (hence A* category—see discussion below). As to the alkaline compounds, it is seen that calcium hydroxide and calcium bicarbonate demonstrate poor activity. Highly concentrated (nearly saturated) alkali metal compounds produce herbicidal effect but are no match for Roundup® (1A-1L).

Binary combinations consisting of alkali hydroxide/Ca (OH)$_2$ are able to inflict severe damage to the weed when applied at fairly low amounts (2-O and 2-P). That is, it is possible to reduce the applied amounts of the alkaline agents and still achieve acceptable effect when such binary combinations are used.

Enhanced activity is demonstrated by ternary combinations consisting of sodium hydroxide, potassium hydroxide and calcium hydroxide (or calcium bicarbonate). The 5:3:2 combinations achieved complete weed control faster than Roundup® at surprisingly low amounts of the individual components (3-Q, 3-R, 3-U and 3-V). The 3:3:4 and 4:3:3 combinations were also effective. Additionally, getting new grass to grow in plots treated with such combinations, e.g., plots 3-S and 3-T, met with difficulties and resulted in poor quality grass, indicating that the alkaline calcium compound accounts for a prolonged effect.

Furthermore, species which survived the Roundup® treatment in the 1-N plot were identified (*Vitex cymosa, Conyza sumatrensis, Digitaria insularis, Euphorbia heterophylla* and *Bidens subaltern*). These glyphosate-resistant weeds did not survive in the 3-Q, 3-R, 3-U and 3-V plots after the treatment with the ternary combinations of the invention. Interestingly, an attempt to augment the effect of 2.5% by weight Roundup® sprayable solution by addition of equal amount of the NaOH/KOH/Ca(OH)$_2$ herbicide (i.e., 2.5% by weight, mixing ratio of the hydroxides 5:3:2) did not produce significant improvement.

30 days after the treatment, various properties of the soil were measured, as appropriate. pH was nearly neutral or weakly alkaline. The salinity (abbreviated Sal.) of the soil did not change (determined by extraction and titration with KCl). The ratio Ca/K in the soil increased, as indicated by the upward pointing arrow. (ND: not determined; NC: no change).

Example 5

Weed Control: Large Scale Field Experiment

The herbicidal combination emerging as a promising candidate for weed control based on the results of the field experiment reported in Example 4, namely, NaOH/KOH/Ca (OH)$_2$ (5:3:2) was tested and compared to Roundup®, this time in large plot experiment.

A weedy field was divided into four 100 m$^2$ plots, designated "Site 1", "Site 2" and "Site 3". Each field was treated with a different type of herbicide:

Site 1: Roundup®; 2 L diluted with 100 L of water.
Site 2: Roundup®+NaOH/KOH/Ca(OH)$_2$; 2 L of commercial product+500 g NaOH/KOH/Ca(OH)$_2$ (5:3:2) diluted with 100 L of water.
Site 3: NaOH/KOH/Ca(OH)$_2$; (10 g in liter water, 5:3:2).

The herbicidal compositions were sprayed at rate of application of 10 liter per 100 m$^2$. Soil samples were collected before the treatment started (t=0 days) and after 14 days (t=14 days) to measure various soil parameters as tabulated below in Table 2.

The results of the large plot experiment (each plot having a size of 100 m$^2$) were consistent with the results reported in the smaller scale experiment (where each plot had a size 1 m$^2$) of Example 4. That is, the most efficient treatment was observed in Site 3, showing an accelerated effect compared to Roundup®.

TABLE 2

| | SITE 1 | | SITE 2 | | SITE 3 | |
|---|---|---|---|---|---|---|
| | t = 0 days | t = 14 days | t = 0 days | t = 14 days | t = 0 days | t = 14 days |
| PH | 5.74 | 5.92 | 6.4 | 6.78 | 6.24 | 6.59 |
| K cmol/LS | 0.37 | 0.32 | 1.04 | 1.22 | 0.66 | 0.65 |
| Na cmol/LS | 0.33 | 0.38 | 0.36 | 0.55 | 0.26 | 0.71 |

TABLE 2-continued

| | SITE 1 | | SITE 2 | | SITE 3 | |
|---|---|---|---|---|---|---|
| | t = 0 days | t = 14 days | t = 0 days | t = 14 days | t = 0 days | t = 14 days |
| Ca cmol/LS | 6.28 | 5.87 | 6.16 | 6.18 | 6.38 | 5.87 |
| TOC mg/kg | 2.33 | 2.27 | 2.23 | 2.57 | 2.50 | 2.47 |
| Organic material mg/kg | 4.01 | 3.91 | 3.83 | 4.39 | 4.29 | 4.25 |
| Moisture % | 23.85 | 22.35 | 23.9 | 23.8 | 24.5 | 22.8 |

The invention claimed is:

1. A method of combatting weeds, comprising:

applying to a soil region an herbicidal combination comprising sodium hydroxide, potassium hydroxide and calcium bicarbonate, wherein the total amount of the sodium hydroxide and the potassium hydroxide by weight of the herbicidal combination is greater than the amount of the calcium bicarbonate.

2. The method according to claim 1, wherein a weight ratio [NaOH+KOH]:Ca(HCO$_3$)$_2$ is in a range from 10:1 to 1.5:1.

3. The method according to claim 1, wherein a weight ratio [NaOH+KOH]:Ca(HCO$_3$)$_2$ is in a range from 5:1 to 1.5:1, with a weight ratio NaOH:KOH in a range from 5:1 to 1:5.

4. The method according to claim 3, wherein the weight ratio [NaOH+KOH]:Ca(HCO$_3$)$_2$ is from 5:1 to 3:1, with the weight ratio NaOH:KOH in a range from 3:1 to 1:1.

5. The method according to claim 3, wherein the weight ratio [NaOH+KOH]:Ca(HCO$_3$)$_2$ is from 3:1 to 1.5:1, with the weight ratio NaOH:KOH in a range from 3:1 to 1:1.

6. The method according to claim 1, for controlling glyphosate-resistant species.

7. The method according to claim 1, devoid of simultaneous application of an organic herbicide.

8. The method according to claim 1, wherein the herbicidal combination is applied to keep an area around railways free from vegetation.

9. The method according to claim 1, wherein the herbicidal combination is applied to control weeds in an agricultural area to be seeded or planted.

10. The method according to claim 1, wherein the herbicidal combination is applied as a mixed composition of individual components in a sprayable solution or suspension, and wherein a total amount of sodium hydroxide, potassium hydroxide and calcium bicarbonate is from 10 grams to 250 grams per liter water.

11. The method according to claim 1, wherein the herbicidal combination is applied as a mixed composition of individual components in a solid form.

12. The method according to claim 1, wherein a weight ratio of [NaOH+KOH]:Ca(HCO$_3$)$_2$ is in a range from 100:1 to 1.5:1.

13. The method according to claim 1, wherein a weight ratio [NaOH+KOH]:Ca(HCO$_3$)$_2$ is in a range from 30:1 to 1.5:1.

* * * * *